(12) United States Patent
Reid

(10) Patent No.: US 7,545,994 B2
(45) Date of Patent: *Jun. 9, 2009

(54) METHOD AND APPARATUS FOR DIGITAL IMAGE MANIPULATION TO REMOVE IMAGE BLEMISHES

(75) Inventor: Russell Reid, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/852,270

(22) Filed: Sep. 7, 2007

(65) Prior Publication Data

US 2007/0297691 A1    Dec. 27, 2007

Related U.S. Application Data

(63) Continuation of application No. 10/338,786, filed on Jan. 6, 2003, now Pat. No. 7,277,595.

(51) Int. Cl.
*G06K 9/00* (2006.01)
*G06K 9/40* (2006.01)
*G09G 5/00* (2006.01)
*G09G 5/02* (2006.01)

(52) U.S. Cl. .................. 382/275; 382/167; 382/274; 345/594; 345/606

(58) Field of Classification Search .......... 382/162, 382/167, 254, 274, 275; 345/586, 594, 606; 358/452, 463, 531, 537
See application file for complete search history.

(56) References Cited

U.S. PATENT DOCUMENTS

| 5,229,864 | A | | 7/1993 | Moronaga et al. |
| 6,160,923 | A | * | 12/2000 | Lawton et al. ............... 382/275 |
| 6,313,840 | B1 | * | 11/2001 | Bilodeau et al. ............ 345/423 |
| 6,587,592 | B2 | * | 7/2003 | Georgiev et al. ............ 382/254 |
| 6,870,954 | B1 | | 3/2005 | Gupta |
| 7,002,594 | B2 | * | 2/2006 | Yoshida et al. .............. 345/600 |
| 7,010,163 | B1 | | 3/2006 | Weiss |
| 7,277,595 | B1 | | 10/2007 | Reid |
| 2002/0012452 | A1 | * | 1/2002 | Van Overveld et al. ..... 382/107 |
| 2003/0012452 | A1 | * | 1/2003 | Trifonov et al. ............. 382/275 |

OTHER PUBLICATIONS

Ballester et al. ("Filling-In by Joint Interpolation of Vector Fields and Gray Levels", IEEE Transaction on Image Processing, vol. 10, No. 8, Aug. 2001, pp. 1200-1211).*

(Continued)

*Primary Examiner*—Yubin Hung
(74) *Attorney, Agent, or Firm*—Adeli & Tollen LLP

(57) ABSTRACT

To better realize the great potential of amateur digital photography, the present invention introduces an intuitive system for digital manipulation. The system of the present invention allows a user to simply fix small blemishes in digital images. In one embodiment, the user merely places a cursor on the image blemish and activates a cursor control device such as a mouse button. In one embodiment, the blemish repair system is implemented using one of Dirichlet's theorems. The theorem provides a method of creating a smooth surface within a circle by using the values of points around the circle. To prevent the result from appearing too smooth, some pixelization may be added.

15 Claims, 12 Drawing Sheets

OTHER PUBLICATIONS

Carrier et al. (Functions of a Complex Variable: Theory and Technique, McGraw-Hill Book Co., NY, 1966, p. 47).*
Zarantonello et al. ("Domain Decomposition, Boundary Integrals, and Wavelets", SPIE vol. 2569, 1995, pp. 866-875).*
Atkinson (An Introduction to Numerical Analysis, John Wiley & Sons Publisher, 1978, 482-485).*
Boyle et al. ("The effects of filtered video on awareness and privacy", Proc. ACM Conference on Computer Supported Cooperative Work, Dec. 2000).*
Commonly owned U.S. Appl. No. 12/029,453, filed Feb. 11, 2008, Weiss, Ben.
Non-Final Office Action of commonly owned U.S. Appl. No. 10/338,786, mailing date Jun. 6, 2006, Reid, Russell, now issued Patent 7,277,595 listed as item #4.
Final Office Action of commonly owned U.S. Appl. No. 10/338,786, mailing date Dec. 4, 2006, Reid, Russell, now issued Patent 7,277,595 listed as item #4.
Notice of Allowance of commonly owned U.S. Appl. No. 10/338,786, mailing dated May 22, 2007, Reid, Russell, now issued Patent 7,277,595 listed as item #4.
Bertalmio et al., "Image Inpainting", Proc. 27th Conf. on Computer Graphics and Interactive Techniques, Jul. 2000, pp. 417-424.

* cited by examiner

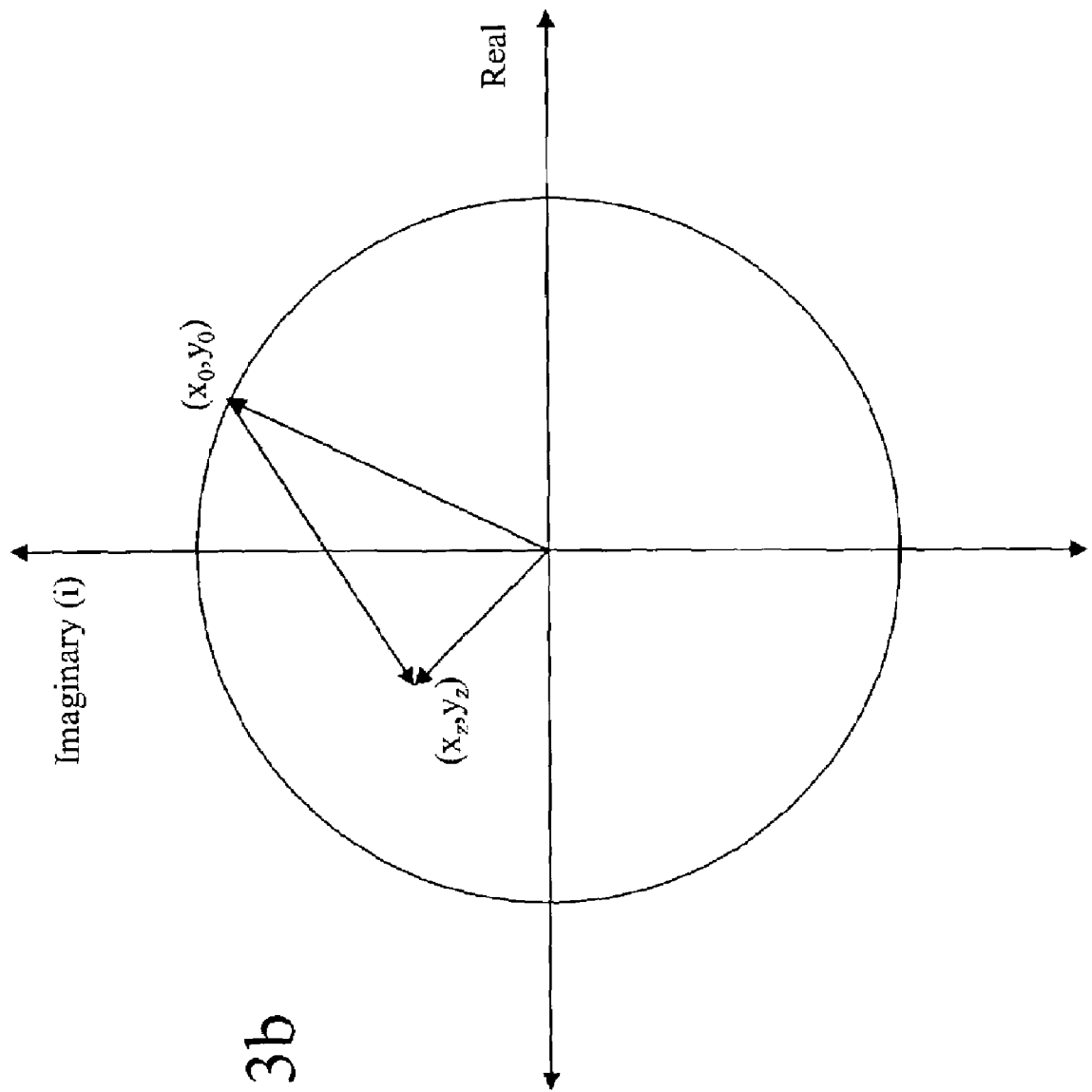

METHOD AND APPARATUS FOR DIGITAL IMAGE MANIPULATION TO REMOVE IMAGE BLEMISHES

CLAIM OF BENEFIT TO PRIOR APPLICATION

This Application is a continuation application of U.S. patent application Ser. No. 10/338,786 filed Jan. 6, 2003 entitled "Method and Apparatus for Digital Image Manipulation to Remove Image Blemishes", which issued as U.S. Pat. No. 7,277,595 on Oct. 2, 2007.

FIELD OF THE INVENTION

The present invention relates to the field of digital photography. In particular the present invention discloses a system for digital image processing.

BACKGROUND OF THE INVENTION

With improved technology and sharply reduced digital camera pricing, digital photography is rapidly replacing traditional film photography. With digital photography, there is no waiting for photographic film to be processed. Instead, most digital cameras allow the photographer to instantly review the digitally captured images. With this ability, the photographer may take another shot if he or she is not satisfied with the first digital images.

Digital photography has given amateur digital photographers new avenues of image distribution. Amateur digital photographs can easily be published on the world-wide web (WWW) to allow anyone on the Internet to view the digital photographs. Internet users can also email digital photographs as attachments or embedded within HTML formatted email messages.

One of the most powerful aspects of digital photography is ability to perform digital image manipulation. Digital image manipulation programs can be used to manipulate digital photographs in order to correct flaws, modify colors, etc. However, the potential of digital image manipulation by amateurs remains largely unrealized. The only image manipulation used by most amateur digital photographers is the rotation of digital images to correct the orientation of the image. Digital image manipulation largely remains the domain of experts since quality image manipulation software is often too expensive for the amateur photographer and too difficult to use for the casual user.

To better realize the great potential of amateur digital photography, it would be very desirable to have improved digital image manipulation tools that are available for amateur digital photography enthusiasts. These digital image manipulation tools should be highly intuitive yet provide powerful features for manipulating digital images.

SUMMARY OF THE INVENTION

To better realize the great potential of amateur digital photography, the present invention introduces an intuitive system for digital manipulation. The system of the present invention allows a user to simply fix small blemishes in digital images. In one embodiment, the user merely places a cursor on the image blemish and activates a cursor control device such as a mouse button.

In one embodiment, the blemish repair system is implemented using one of Dirichlet's theorems. The theorem provides a method of creating a smooth surface within a circle by using the values of points around the circle. To prevent the result from appearing too smooth, some pixelization may be added.

Other objects, features, and advantages of present invention will be apparent from the company drawings and from the following detailed description.

BRIEF DESCRIPTION OF THE DRAWINGS

The objects, features, and advantages of the present invention will be apparent to one skilled in the art in view of the following detailed description in which:

FIG. 3b illustrates a vector subtraction of a vector to a point in the unit circle from a vector to a point on the unit circle.

DETAILED DESCRIPTION OF THE PREFERRED EMBODIMENT

A method and apparatus for the digital manipulation of images to removal blemishes is disclosed. In the following description, for purposes of explanation, specific nomenclature is set forth to provide a thorough understanding of the present invention. However, it will be apparent to one skilled in the art that these specific details are not required in order to practice the present invention. For example, the present invention has been described with reference to one of Dirichelt's Theorems. However, the system of the present invention may use other types of function interpolation methods.

Digital Image Blemishes

Digital photography is rapidly replacing traditional film photography. One of the most powerful aspects of digital photography is ability to perform image manipulation upon captured digital images. Digital image manipulation programs can be used to manipulate digital photographs in order to correct image flaws, modify image colors, and perform other image corrections. Most image manipulation can be performed on a typical personal computer system such as the iMac personal computers from Apple Computer, Inc. of Cupertino, Calif.

Image Processing Computer System

Figure 1:
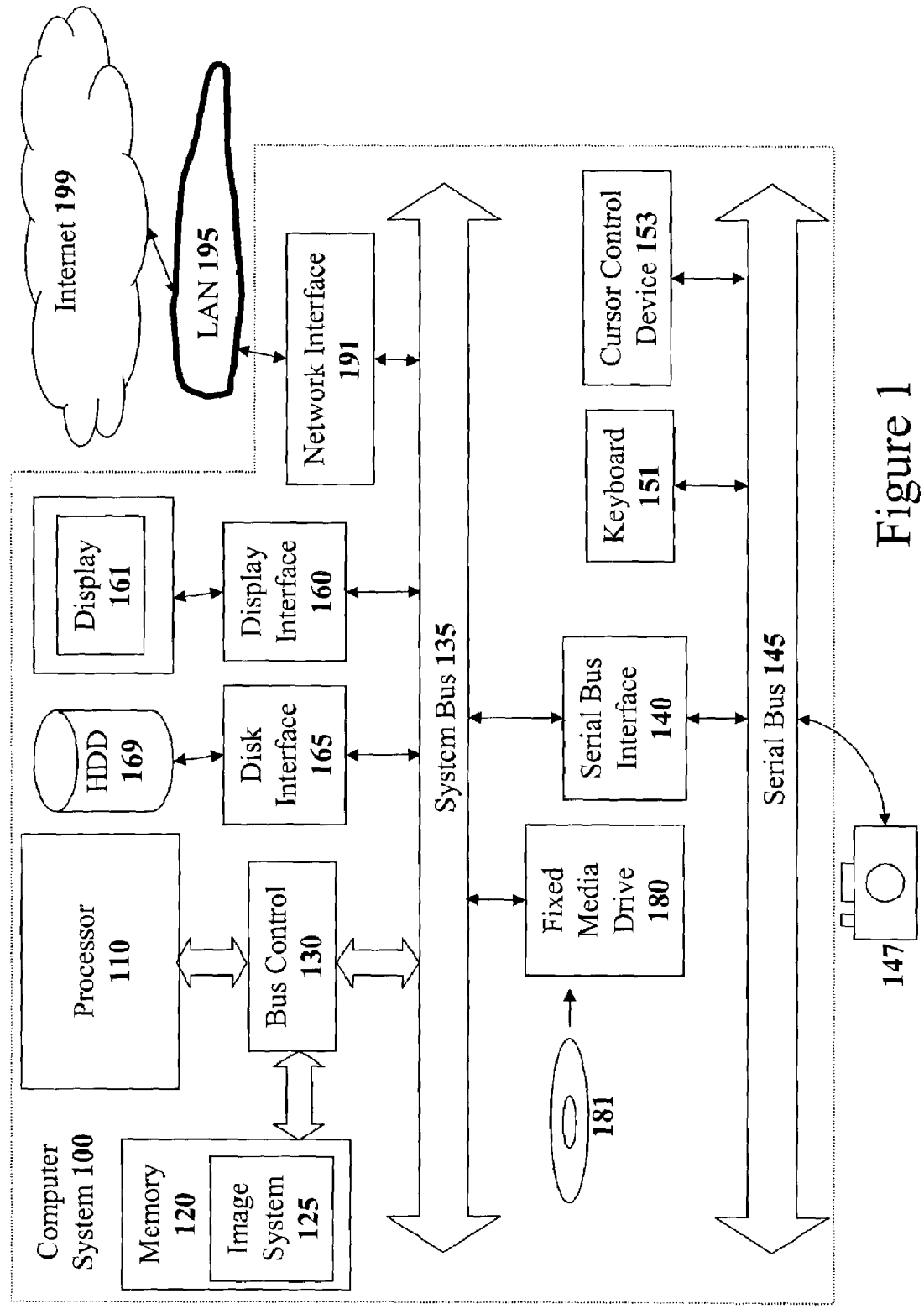
FIG. 1 illustrates a block diagram of a computer system that may be used to implement the present invention.

FIG. 1 illustrates an exemplary embodiment of a computer system 100 that may be used to implement the teachings of the present invention. Computer system 100 may be a typical personal computer system with a processor 110, a memory 120, and a bus controller 130 for controlling a system bus 135. Various different Input/Output devices may be coupled to the system bus 135 to allow the computer system 100 to interact with the outside world. For example, computer system 100 includes the input/output devices of a hard disk drive (HDD) 169, a display device 161 (such as a CRT or flat panel display), a keyboard 151, a cursor control device 153 (such as a computer mouse, track pad, or trackball), a fixed media drive 180, and network interface 191 for coupling to a network such as local area network (LAN) 195.

The image manipulation system 125 of the present invention resides in the memory 120 of computer system 100 as a set of computer instructions. The image manipulation system may also reside as a program on a fixed media device 181 such as Compact Disc Read-Only-Memory (CD-ROM) or Digital Versatile Disc Read-Only-Memory (DVD-ROM). The fixed media device is used with an associated fixed media drive 180 such as a CD-ROM drive or DVD-ROM drive, respectively. Alternatively, the image manipulation system 125 may be downloaded from across a network such as the global Internet 199 accessible through network interface 191.

The first task of the image blemish removal system of the present invention is to acquire digital images to process. Referring to FIG. 1, the acquired images are normally stored onto a mass storage device such as hard disk drive (HDD) 169. In one embodiment of the present invention, the image manipulation system 125 may acquire digital images from a number of different sources.

To acquire images, the system of the present invention may include driver software necessary to automatically identify and interoperate with several different types of digital cameras that may be coupled to the host computer system. For example, FIG. 1 illustrates a digital camera system 147 coupled to serial bus 145 controlled by serial bus interface 140 of the computer system 100. Serial bus 145 may be an IEEE 1394 Firewire serial bus, a Universal Serial Bus (USB), or any other type of serial bus. In a preferred embodiment, the system is able to automatically recognize when digital camera system 147 is coupled to computer system 100 such that the digital images in digital camera system 147 can be acquired.

The system can also acquire images in a number of other manners. For example, film photographs may be placed onto a floppy disc (not shown) or onto a fixed media device 181 by a film developer at the request of the film photographer. Such photos may be acquire by image manipulation system 125 by having the user place the floppy disc (not shown) or the fixed media device 181 into the appropriate drive such as floppy disc drive (not show) or the fixed media drive 180.

Digital images may also be obtained through a computer network interface 191 of computer system 100. For example, a user may obtain digital images from a World Wide Web (WWW) site on the global Internet 199. Digital images may also be obtained using a digital scanner (not shown) coupled to computer system 100 as is well known in the art.

Image Blemishes

Captured digital images do not always appear the way we would like the digital images to appear. For example, acne appearing at an inopportune time can mar the digital image captured of a teen-ager on his Senior Prom. An airplane in the corner sky may disturb any otherwise perfect digital image of a beautiful sunset in a nature setting. A particle of dust on the Charge Coupled Device (CCD) sensor of a digital camera, or on its lens, may result in a black spot on every image. Such small undesirable flaws in a digital image are referred to as 'blemishes.'

Film photographs tend to be even more susceptible to having image blemishes. The source film may become scratched causing a white line or white dot to appear on a photograph. Hair or dust may be present on a film lens or during the scan of a traditional film-based photograph used to bring the photograph into the digital domain. These blemishes distract the viewer from completely enjoying the image.

It would therefore be desirable to provide users with a blemish removal tool for repairing such image blemishes. Ideally, the blemish removal solution should be simple and intuitive such that any computer user could easily use the blemish removal tool.

Blemish Removal Overview

Figure 2A:
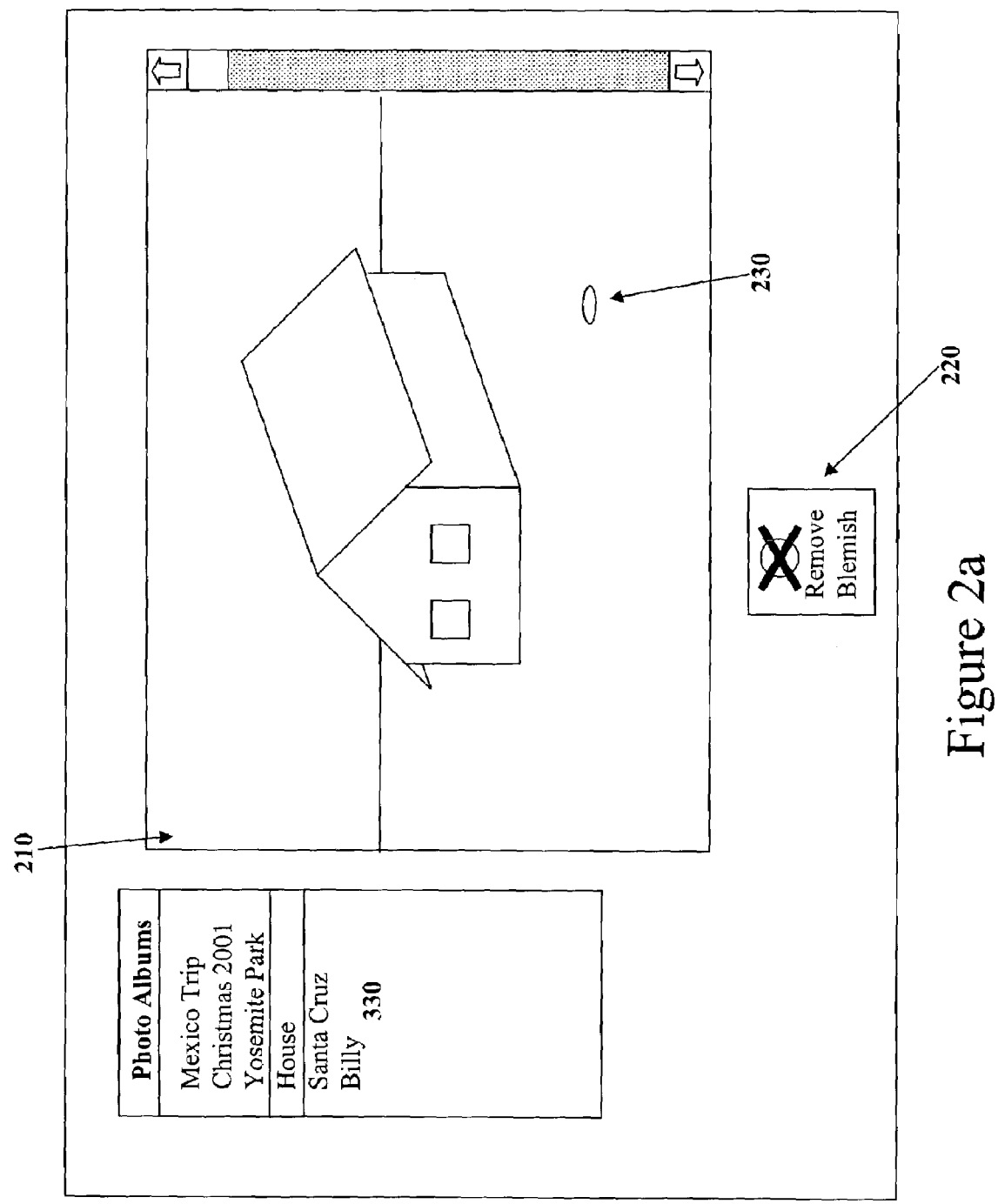
FIG. 2a illustrates one embodiment of an example graphical user interface for the blemish removal system of the present invention.

The present invention introduces a simple and intuitive blemish removal tool that may be used to remove unsightly blemishes from digital images. For example, FIG. 2a illustrates one embodiment of an example graphical user interface for the blemish removal system of the present invention. In FIG. 2a, an image window 210 contains an image of a house to use for a real estate listing web site. Unfortunately, a child left his Frisbee 230 in the yard thus disturbing the perfect image of the house. In order to remove the blemish (the Frisbee), a user may select the blemish removal tool by clicking on button 220.

Figure 2B:
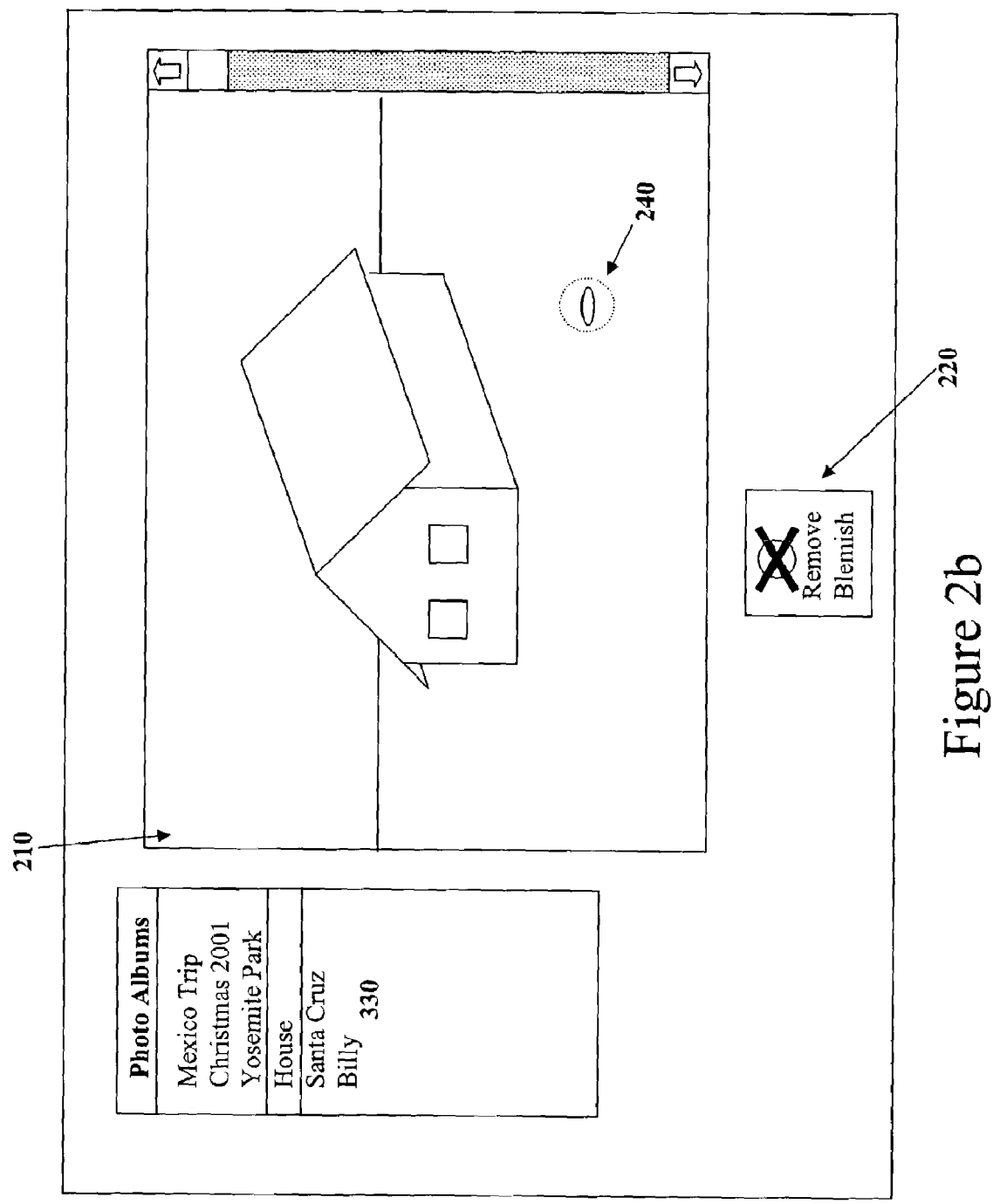
FIG. 2b illustrates the graphical user interface embodiment of FIG. 2a where the blemish removal system is being activated on an area of an image.

FIG. 2b illustrates the graphical user interface embodiment of FIG. 2a after the user has clicked on the blemish removal button 220. The system then displays a small circle 240 on the image that may be moved using a cursor control device such as a mouse. In one embodiment, the size of circle 240 is determined as a function of the size of the overall image. One specific embodiment sets the radius of small circle as:

$$\text{radius} = \frac{\sqrt{\text{width} * \text{height}}}{125} \tag{1}$$

In another embodiment, the user is allowed to determine the size of circle 240. However, the blemish removal tool will work best with small circles.

Figure 2C:
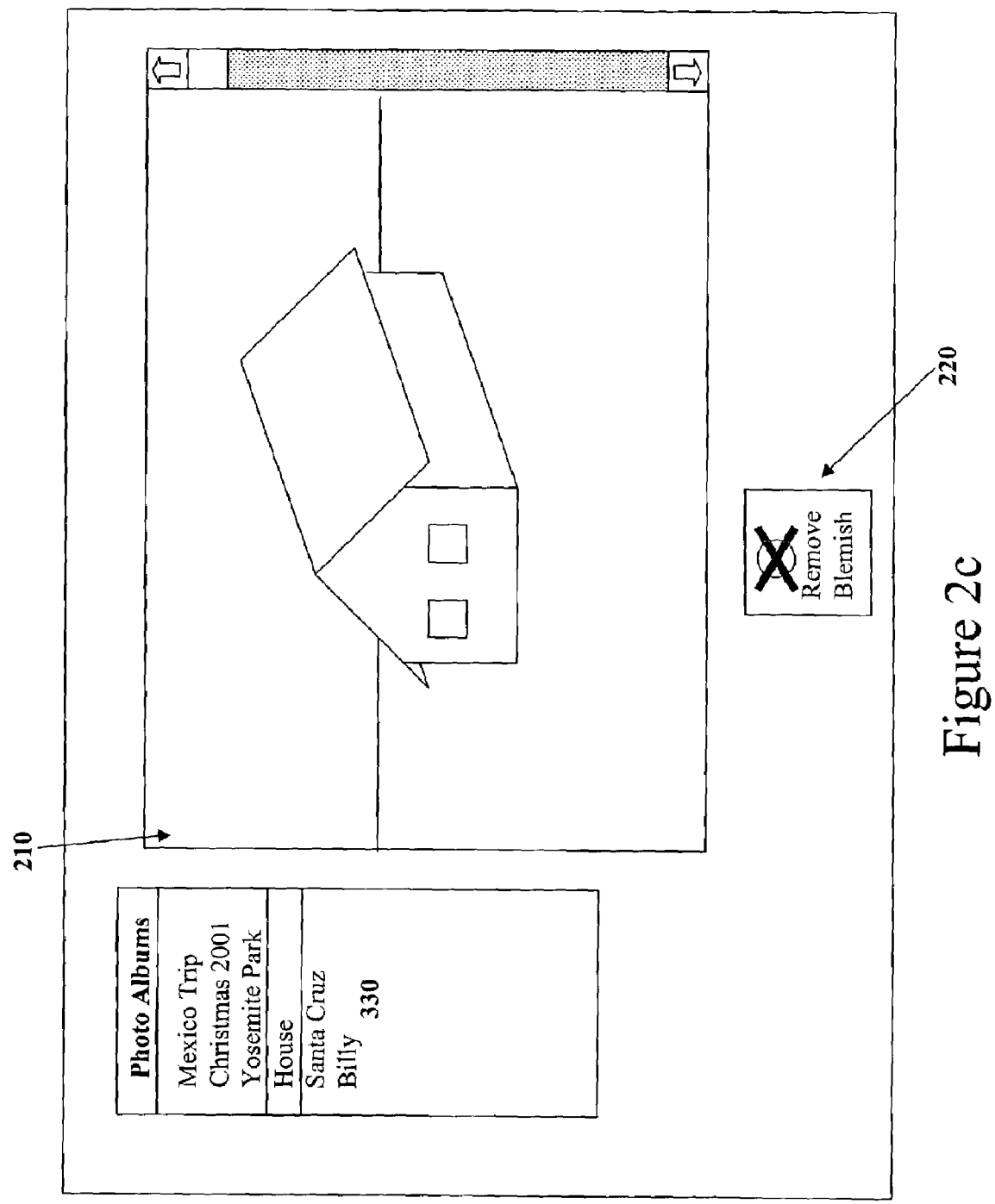
FIG. 2c illustrates the graphical user interface embodiment of FIG. 2b after the blemish has been removed from the image.

Referring again to FIG. 2b, the user places circle 240 such that it surrounds the blemish. After the user has placed circle 240 on the blemish, the user simply requests the user to repair the blemish. The request may be indicated by activating a switch on a cursor control device such as a mouse button. FIG. 2c illustrates the graphical user interface embodiment of FIG. 2b after the blemish has been repaired. In one embodiment, the user is given the option of creating completely new pixels for the blemish area or creating a blend of the existing pixels and new pixels.

Figure 2D:
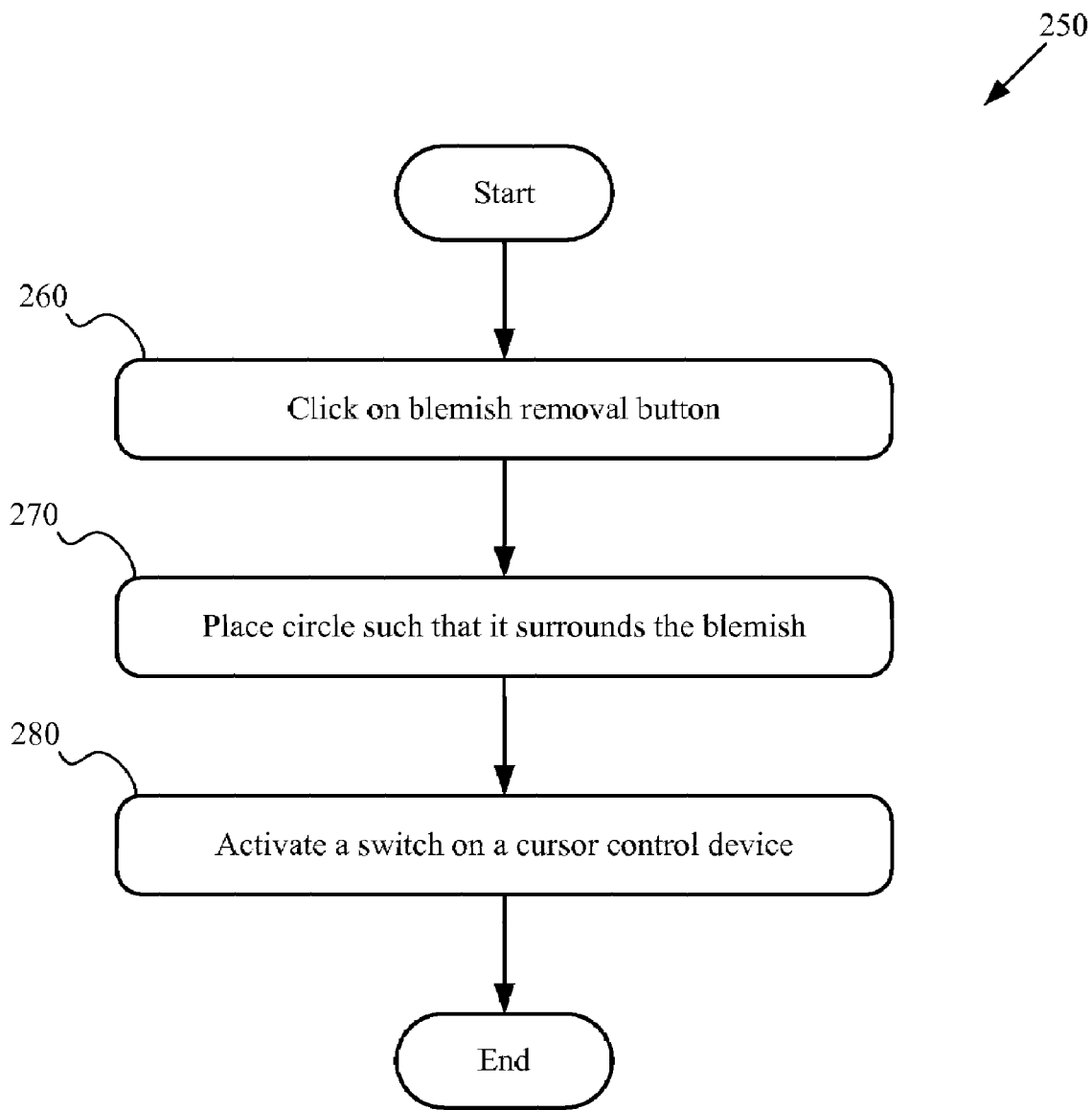
FIG. 2d illustrates a process for removing a blemish.

FIG. 2d illustrates a process 250 of using a simple and intuitive blemish removal tool that may be used to remove unsightly blemishes from digital images. In FIG. 2a, an image window 210 contains an image of a house to use for a real estate listing web site. Unfortunately, a child left his Frisbee 230 in the yard thus disturbing the perfect image of the house. In order to remove the blemish (the Frisbee), a user may select the blemish removal tool by clicking on button 220. After the user has clicked on the blemish removal button 220, the system then displays a small circle 240 on the image that may be moved using a cursor control device such as a mouse (at 260). Referring again to FIG. 2b, the user places circle 240 such that it surrounds the blemish (at 270). After the user has placed circle 240 on the blemish, the user simply requests repair of the blemish. The request may be indicated by activating a switch on a cursor control device such as a mouse button (at 280).

Blemish Removal Embodiment Details

A number of different methods of performing the blemish removal may be used to implement the invention. In one embodiment, one of Dirichlet's Theorems in the imaginary number domain is used to perform blemish removal. The use of the Dirichlet Theorem allows the blemish repair tool to calculate the only unwrinkled surface that fits exactly into the existing photo at the edges of a circle around the blemish point.

The Math

The Dirichlet Theorem in the imaginary number domain used by the present invention is expressed as follows:

$$U(Z) = \frac{1}{2\pi}\int_0^{2\pi} f(e^{i\theta}) \frac{1 - |Z|^2}{|Z - e^{i\theta}|^2} d\theta \qquad (2)$$

where Z is an imaginary number that can be expressed in the form of:

$$Z = x + yi \qquad (3)$$

Figure 3A:
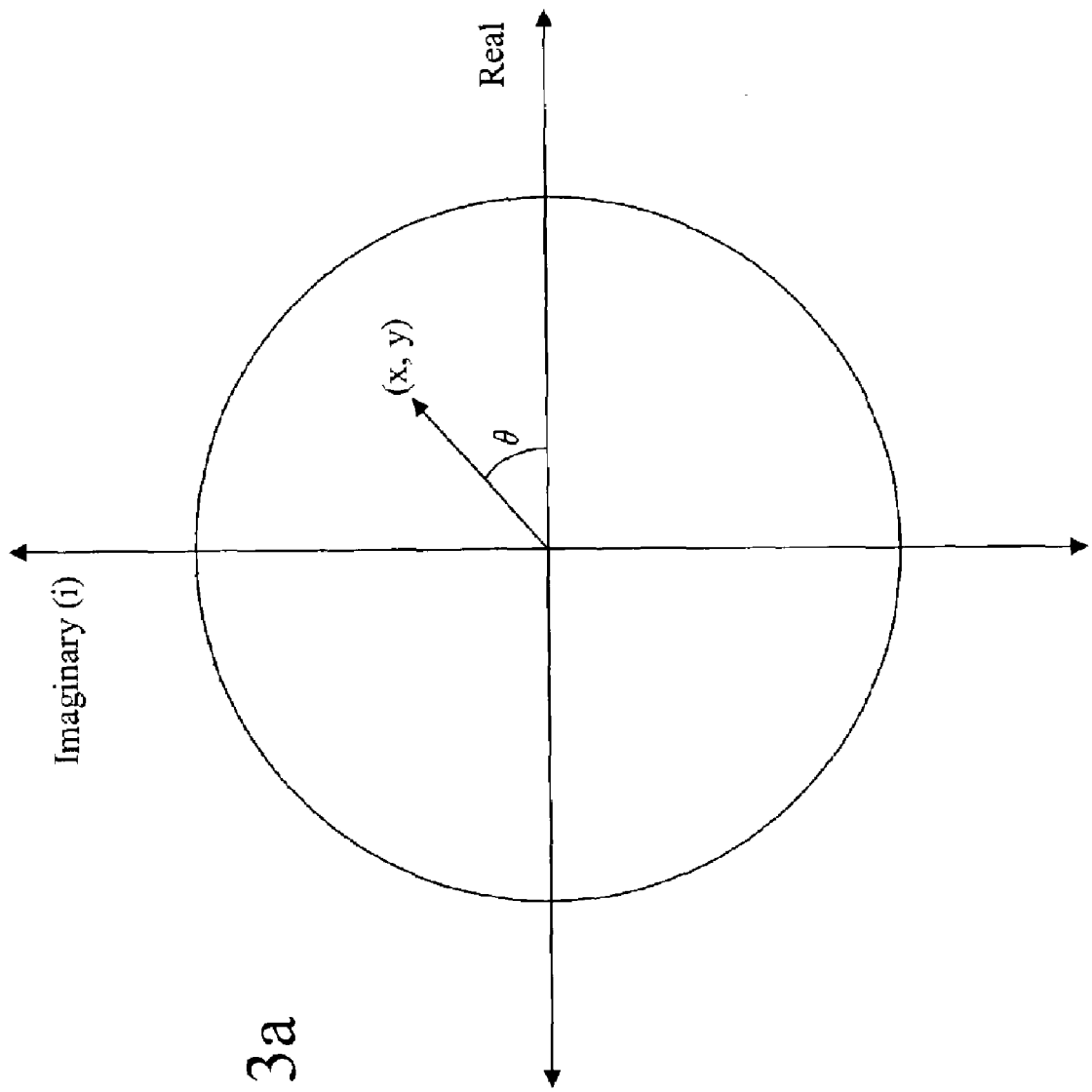
FIG. 3a illustrates an imaginary number plotted on a Cartesian coordinate system with the real number portion on the x-axis and the imaginary portion on the y-axis.

Imaginary numbers are commonly plotted on a Cartesian coordinate system with the real number portion on the x-axis and the imaginary portion on the y-axis as illustrated in FIG. 3a. The absolute value of an imaginary number is the length of the imaginary vector x+yi. Specifically:

$$|Z| = |x + yi| = \sqrt{x^2 + y^2} \qquad (4)$$

The Dirichlet Theorem of equation (2) generates a smooth two-dimensional function for all the area enclosed within a unit circle on the real/imaginary plane since:

$$e^{i\theta} = \cos\theta + i(\sin\theta) \qquad (5)$$

Equation (2) operates by computing a value for internal pixel (Z) as a function of all the vales of pixels around the unit circle ($f(e^{i\theta})$). Substituting equations (3), (4), and (5) into equation (2) yields:

$$U(x + yi) = \frac{1}{2\pi}\int_0^{2\pi} f(\cos\theta + i(\sin\theta)) \frac{1 - (x^2 + y^2)}{|x + yi - \cos\theta - (\sin\theta)i|^2} d\theta \qquad (6)$$

Figure 3C:
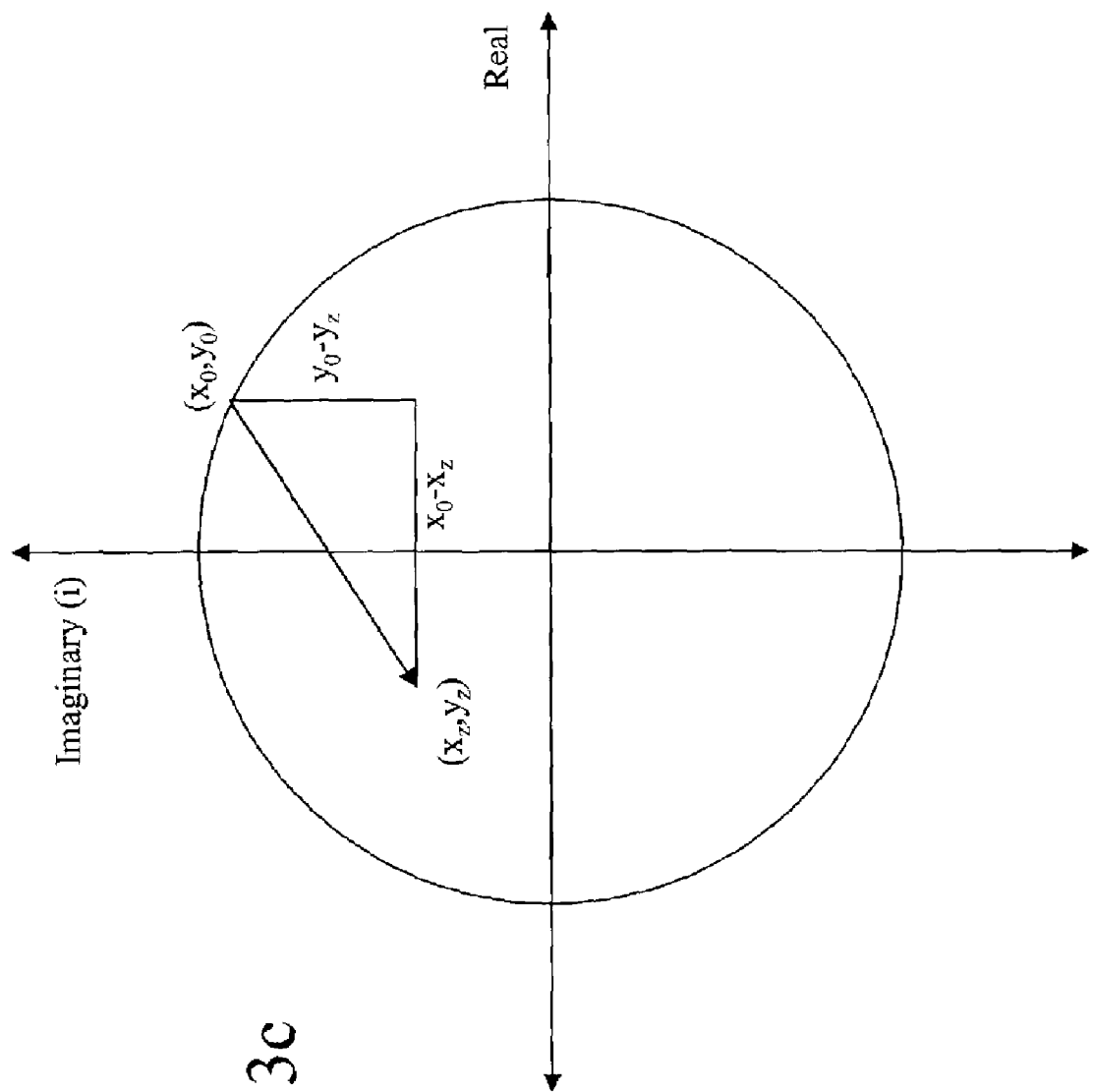
FIG. 3c illustrates a method of determining the magnitude of the difference vector of FIG. 3b.

The denominator contains the vector subtraction x+yi−cos θ−(sin θ)i which is subtracting the vector of the x+yi position (x, y) being analyzed from the current vector on the unit circle ($x_0$, y0). This vector subtraction is illustrated in FIG. 3b. However, as seen in equation (6), the absolute value of the difference vector is desired. The absolute value of the difference vector can be determined with the Pythagorean Theorem as illustrated in FIG. 3c. Thus, equation (6) can be simplified to:

$$U(x + yi) = \frac{1}{2\pi}\int_0^{2\pi} f(x_0, y_0) \frac{1 - (x^2 + y^2)}{(x - x_0)^2 + (y - y_0)^2} d\theta \qquad (7)$$

Equation (6) serves as the basis for one embodiment of the blemish removal tool of the present invention.

An Implementation

Figure 4:
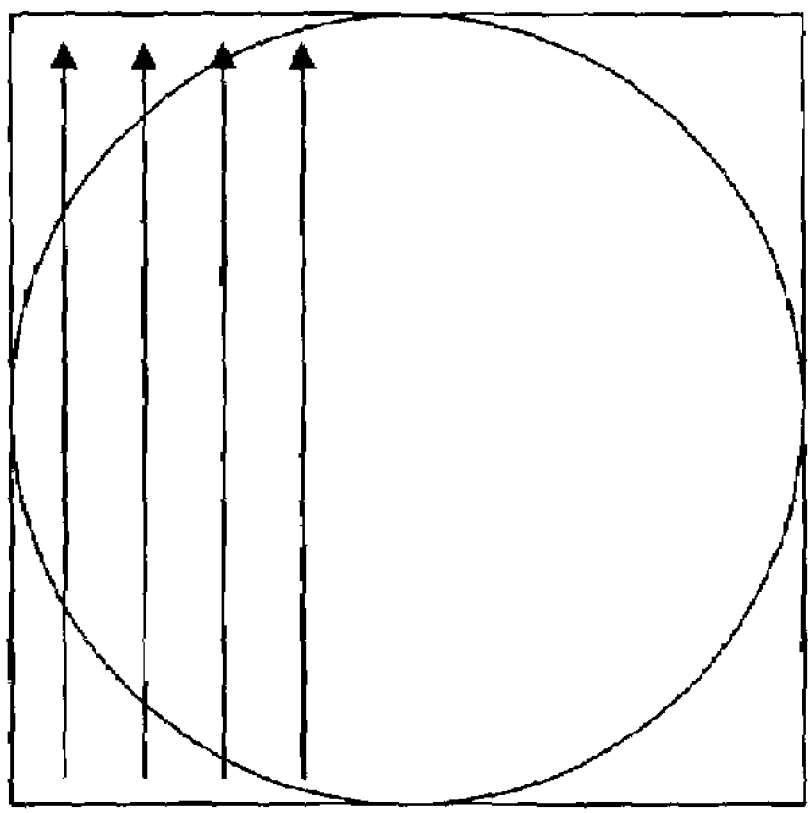
FIG. 4 conceptually illustrates iteration across all the pixels in a circle.

Every pixel in the circle surrounding the blemish may be fixed by using equation (7) on every pixel within the blemish circle. This may be performed by iterating across a square and fixing every point within the circle in the square as illustrated in FIG. 4. Specifically, the following code can fix every pixel within radius r2 of the center of the blemish defined by point xcenter, ycenter:

```
For (i = -r2; i <= r2; i++)         // Iterate across the rows (x)
    {
    for (j = -r2; j<= r2; j++)      // Iterate down the column (y)
        {
        if (i*i + j*j >= r2*r2) continue; // If not in circle, then move to
        next pixel in square.
            fixpixel(imageBuffer, xcenter+i, ycenter+j);
        }
    }
```

Figure 5:
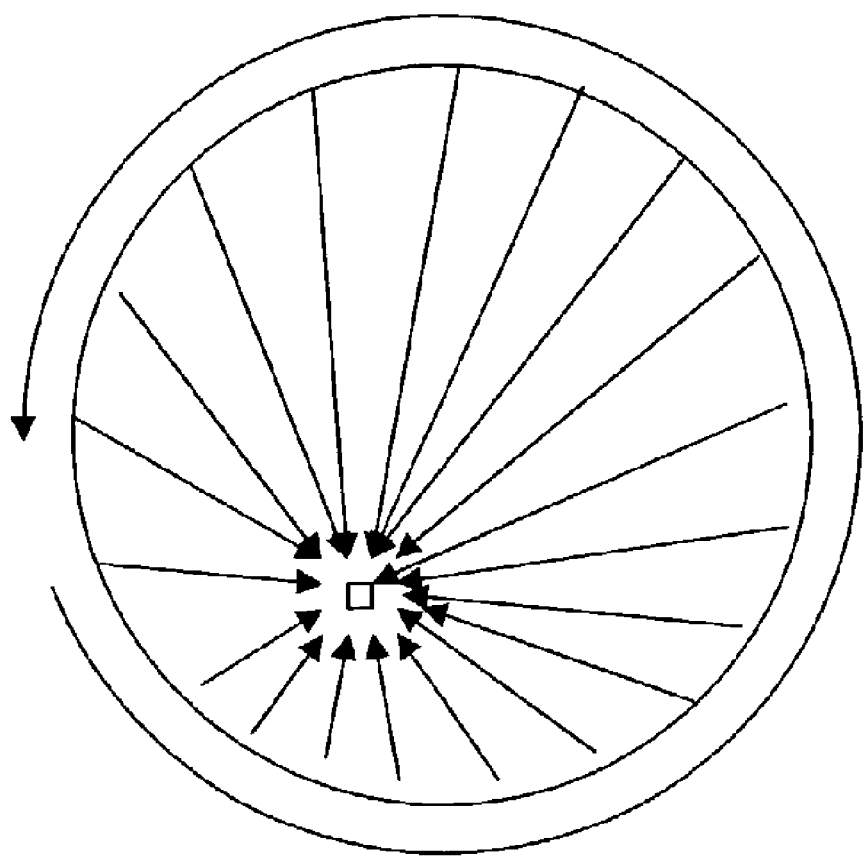
FIG. 5 conceptually illustrates iteration around the border pixels of a circle to generate the value of an inner pixel.

Equation (7) can be implemented with a discrete integral that integrates around a circle of pixels that surround a blemish as conceptually illustrated by FIG. 5. The information from all the pixels around the circle edge affects the value of each pixel within the circle. The following code implements a method of determining the red, green, and blue values for a replacement pixel within the blemish area.

```
// x1 = Current x value inside normalized unit circle
// y1 = Current y value inside normalized unit circle
rsum = gsum = bsum = 0.0; // start with zero
angleIncrement = 1.183 /((float) r1);    // Determine angle increment as function of radius
//Determine # of points around circle as 2*Pi/angle + 1
nCirclePoints = floor(1+ (2*3.14159265358979)/angleIncrement);
k = 0;       // Create sin & cos look-up table for efficiency
for (theta = 0; theta < 2* 3.14159265358979; theta += angleIncrement)
    {
        cosTheta[k  ] = cos(theta);
        sinTheta[k++] = sin(theta);
    }
// Determine Final increment to complete the circle
```

```
finalIncrement = 2*3.14159265358979 - theta + angleIncrement;
zmodsq = x1*x1 + y1*y1;            // squared(|z|) = x1*x1 + y1*y1
npts = 0;
for (k = 0; k < nCirclePoints; k++ )    //Iterate around the blemish border.
  {
    npts++;
    x2 = cosTheta[k]; // X value of current point on normalized unit circle
    y2 = sinTheta[k]; // Y value of current point on normalized unit circle
    xdelta = floor(r1*x2 + 0.5);    // x value of pixel on circle outside blemish
    ydelta = floor(r1*y2 + 0.5);    // y value of pixel on circle outside blemish
    // Calculate address of the pixel on the blemish border
    borderpix = imageBuffer + (ycenter + ydelta)*rowBytes + (xcenter+xdelta)*bytesPerPixel;
    r = (float) borderpix[1];       // Grab red value of border pixel
    g = (float) borderpix[2];       // Grab Green value of border pixel
    b = (float) borderpix[3];       // Grab blue value of border pixel
    if (k < nCirclePoints -1) // Last circle border pixel?
      {
        rsum += r* (1 - zmodsq) / ((x1-x2)*(x1-x2) + (y1-y2)*(y1-y2));
        gsum += g* (1 - zmodsq) / ((x1-x2)*(x1-x2) + (y1-y2)*(y1-y2));
        bsum += b* (1 - zmodsq) / ((x1-x2)*(x1-x2) + (y1-y2)*(y1-y2));
      }
    else
      {
        rsum += finalIncrement/angleIncrement* r* (1-zmodsq) / ((x1-x2)*(x1-x2)+(y1-y2)*(y1-y2));
        gsum += finalIncrement/angleIncrement* g* (1-zmodsq) / ((x1-x2)*(x1-x2)+(y1-y2)*(y1-y2));
        bsum += finalIncrement/angleIncrement* b* (1-zmodsq) / ((x1-x2)*(x1-x2)+(y1-y2)*(y1-y2));
      }
  }
rfinal = rsum/(npts-1.0 + finalIncrement/angleIncrement); // Div by # of pnts-the 1/2*Pi div
gfinal = gsum/(npts-1.0 + finalIncrement/angleIncrement); // Div by # of pnts-the 1/2*Pi div
bfinal = bsum/(npts-1.0 + finalIncrement/angleIncrement); // Div by # of pnts-the 1/2*Pi div
``` where image buffer contains the image, r1 is the radius of the pixel circle around the blemish, xcenter is the x value of center of the blemish, y is the y value of center of the blemish, and x1 & y1 define the point in the unit circle being fixed.

Blemish Repair Tweaks

The blemish removal system described in the previous section will provide a perfectly smooth replacement for the area within the blemish circle. However, a perfectly smooth replacement may appear too perfect. Thus, some pixelization may be created to prevent the repair from appearing unnaturally smooth. The pixelization may be added equally to the red, blue, and green components in order to prevent undesirable color changes.

Figure 6:
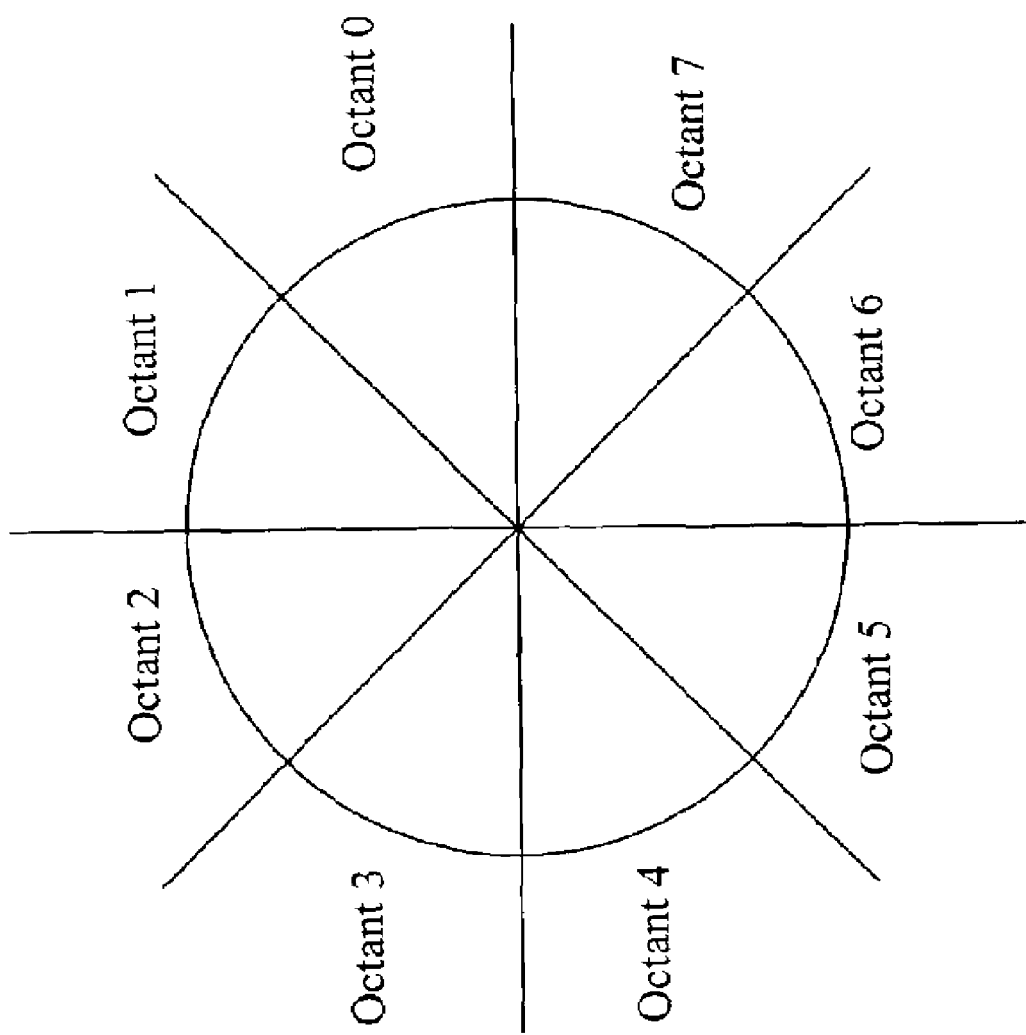
FIG. 6 illustrates a circle divided into octants.

One embodiment operates by first dividing the blemish border into octants as illustrated by FIG. 6. Next, a brightness average and variance for each octant is calculated. The brightness variance and average of the octants are sorted by the amount of variance and the picks the second highest amount of variance is selected to replicate in the blemish repair area.

Figure 7:
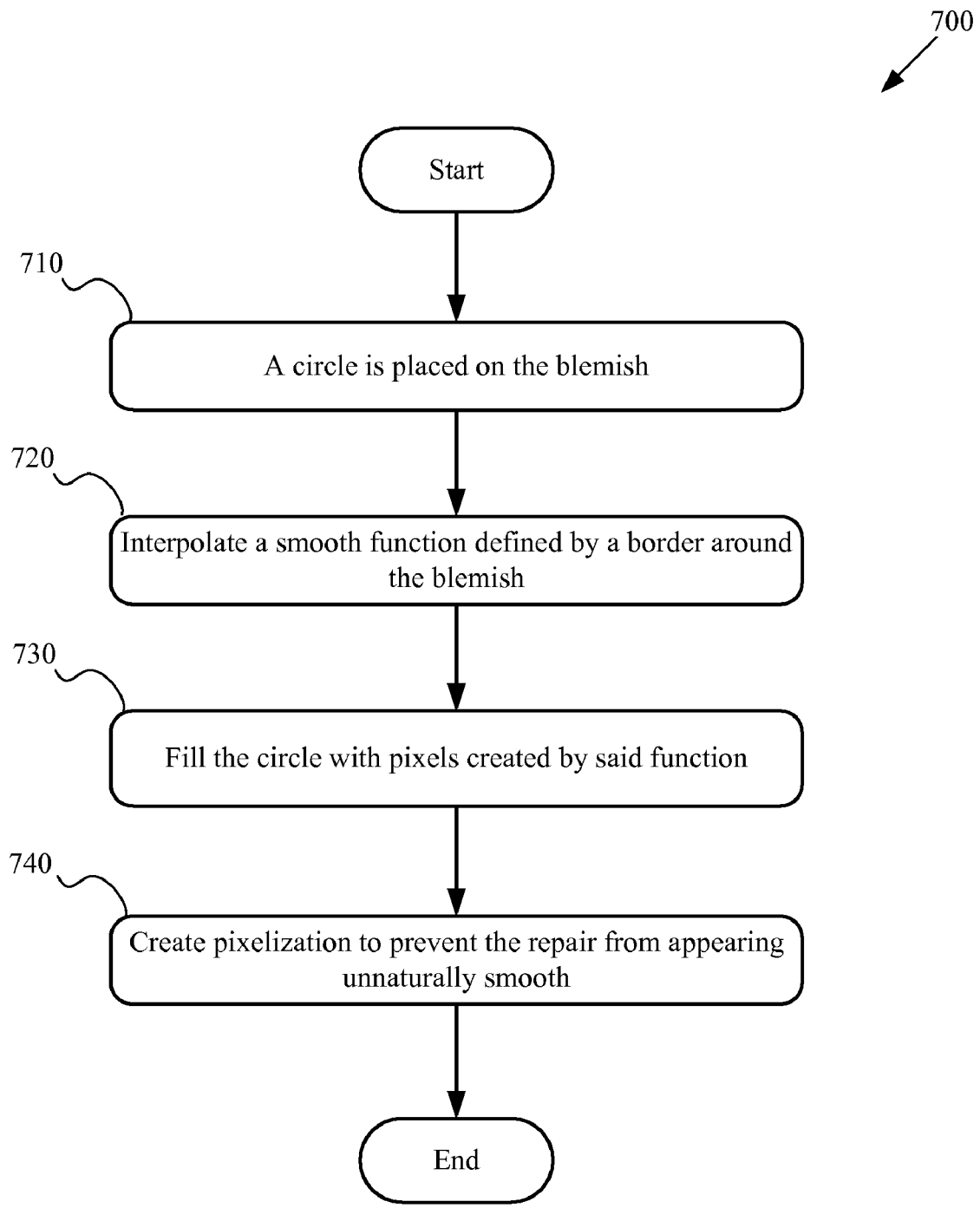
FIG. 7 illustrates a process for editing a digital image to perform blemish removal and smoothing.

FIG. 7 illustrates a process 700 of repairing a blemish in a digital image. The user places a circle on the blemish (at 710). The process 700 interpolates (at 720) a smooth function defined by a set of pixels that define a border around said blemish. Every pixel in the circle surrounding the blemish may be fixed by using (at 730) equation (7) on every pixel within the blemish circle. Some pixelization may be created (at 740) to prevent the repair from appearing unnaturally smooth.

To further blend the blemish repair into the existing image, the blemish repair tool may generate Gaussian noise, the statistical type found in general in digital photos, to modulate the smoothed surface with the computed Gaussian noise. The modulation with Gaussian noise achieves a pixelization that blends with the existing photo.

The following code segments the circle around the blemish into eight octants, calculates the mean and variance in brightness in each of those segments, sorts them, chooses an appropriate variance level, and generates a matching Gaussian noise:

```
brightnessaccum = brightnessSquaredAccum = 0.0;    //Clear accumulators
octant = previousoctant = 0;
for (k = 0; k < nCirclePoints; k++ ) {    //Iterate around the blemish border.
    x2 = cosTheta[k];    // x value of current point on normalized unit circle
    y2 = sinTheta[k];    // y value of current point on normalized unit circle
    xdelta = floor (r1*x2 + 0.5);         // x value of pixel on circle outside blemish
    ydelta = floor (r1*y2 + 0.5);         // y value of pixel on circle outside blemish
    // Calculate address of the pixel on the blemish border & grab it
    pix = imageBuffer +(ycenter+ydelta)*BytesPerRow +(xcenter+xdelta)*bytesPerPixel;
    r = (float) pix[1]; // Grab red value of border pixel
    g = (float) pix[2]; // Grab Green value of border pixel
    b = (float) pix[3]; // Grab blue value of border pixel
    brightness = r+g+b;              // Determine brightness of borderpixel
    octant = k/(nCirclePoints/8);    // Determine what octant we are in
```

```
        if (octant > previousOctant) {
          //calculate average brightness
          avg[previousOctant] = (float) brightnessaccum/(nCirclePoints/8);
          // Calculate variance for previous octant
          var[previousOctant] = brightnessSquaredAccum/(nCirclePoints/8) –
                                          avg[previousOctant]*avg[previousOctant];
          previousOctant = octant;
          brightnessaccum = 0.0;              //Clear accumulators
          brightnessSquaredAccum = 0.0;
        }
        brightnessaccum += (double) brightness;
        brightnessSquaredAccum += (double) brightness*brightness;
      }
      //Sort array of mean and variance values for octants around reference circle
      // from high variance to low variance.
      for (m = 0; m < 7; m++) {
        for (n = 0; n < 7-m; n++) {
          if (var[n+1] < var[n]) { //swap values if lower
              var1 = var[n]; var[n] = var[n+1]; var[n+1] = var1;
              avg1 = avg[n]; avg[n] = avg[n+1]; avg[n+1] = avg1;
          }
        }
      }
      mean = (avg[5]+ avg[6] + avg[7])/3.0 ;   //Array now sorted by size of variance.
      variance = var[1];                       // Choose second highest variance
      rNoise = sqrt(-2.0 * variance * log(1.0 – (float) rand()/((double) RAND_MAX + 0.1)));
      theta2 = (float) 2 * 3.14159265 * rand()/((double) RAND_MAX + 0.1 ) –3.14159265;
      pointgain = (mean + rNoise*cos(theta2))/mean;   // Generate gain, which has Gaussian
                                              //distribution, for specific pixel
      //Some adjustments
      if (pointgain < (mean – 1.8*sqrt(variance))/mean) pointgain=(mean – 1.8*sqrt(variance))/mean;
      if (pointgain > (mean + 2.4*sqrt(variance))/mean) pointgain=(mean + 2.4*sqrt(variance))/mean;
      // Adjust the brightness of the pixel color components
      rfinal = pointgain * rpixel; gfinal = pointgain * gpixel; bfinal = pointgain * bpixel;
```

The above code to cause the pixelization may be combined with the code to perform the pixel repair for a more efficient solution. Specifically, the brightness calculation only needs to be performed once.

The foregoing has described a method and apparatus for the digital manipulation of images to removal blemishes. It is contemplated that changes and modifications may be made by one of ordinary skill in the art, to the materials and arrangements of elements of the present invention without departing from the scope of the invention.

I claim:

1. A method of editing a digital image, the method comprising:
    receiving an identification of a blemish in the digital image;
    interpolating a smooth function defined by a first set of pixels that define a border around the blemish;
    filling an area within the border with a second set of pixels the values of which are defined by the function;
    reducing smoothness of the second set of pixels of said area, after the removal of the blemish, by pixelization of the area, wherein the pixelization is a function of a brightness variance around the area; and
    wherein the receiving, the interpolating, the filling and the reducing steps are performed by a computer.

2. A method of editing a digital image, the method comprising:
    receiving an identification of a blemish in the digital image;
    interpolating a smooth function defined by a first set of pixels that define a border around the blemish;
    filling an area within the border with a second set of pixels the values of which are defined by the function, wherein a size of the area is a function of a size of the digital image;
    reducing smoothness of the second set of pixels of said area, after the removal of the blemish, by pixelization of the area; and
    wherein the receiving, the interpolating, the filling and the reducing steps are performed by a computer.

3. The method of claim 2, wherein the interpolating a smooth function is performed using Dirichiet's Theorem.

4. The method of claim 2 further comprising reducing smoothness of the second set of pixels of said area, after the removal of the blemish, by adding Gaussian noise.

5. The method of claim 2, wherein interpolating a smooth function comprises performing a discrete integral around the area.

6. A method of editing a digital image, the method comprising:
    activating a blemish removal control to display a blemish removal tool;
    moving the blemish removal tool to identify an area that contains or comprises a blemish in the digital image;
    performing a cursor control operation with the blemish removal tool to automatically remove the blemish from said area;
    causing pixelization in the identified area to reduce smoothness of said area after the removal of the blemish, wherein said pixelization is a function of a brightness variance around the area around said blemish; and
    wherein at least the activating and the causing steps are performed by a computer.

7. The method of claim 6, wherein the blemish removal tool comprises a visible boundary of a shape.

8. The method of claim 7, wherein identifying the blemish comprises surrounding the blemish with the visible boundary of the shape.

9. The method of claim 6, wherein identifying the blemish and automatically removing the blemish comprises a cursor control operation of the blemish removal tool.

10. The method of claim 6, wherein a cursor control device operates on the blemish removal tool.

11. A computer readable storage medium storing a computer program which when executed by one or more processors repairs a blemish in a digital image, the computer program comprising sets of instructions for:
- receiving an identification of a blemish;
- interpolating a smooth function defined by a first set of pixels that define a border around the blemish;
- filling an area around the blemish with a second set of pixels created by the function; and
- reducing smoothness of the second set of pixels of said area, after the removal of the blemish, by pixelization of the area around the blemish, wherein the pixelization is a function of a brightness variance around the area around the blemish.

12. The computer readable storage medium of claim 11, wherein the set of instructions for interpolating a smooth function comprises instructions to use Dirichlet's Theorem.

13. The computer readable storage medium of claim 11, wherein the set of instructions for pixelization further comprises instructions for adding Gaussian noise to said area.

14. A computer readable storage medium storing a computer program, executable by one or more processors, said computer program comprising sets of instructions for a graphical user interface ("GUI"), the GUI comprising:
- a display area for displaying an image;
- a blemish removal tool for (i) identifying a region containing a blemish in the image, and (ii) initiating an automated removal of the blemish from the image, wherein the automated removal comprises pixelization of the image to reduce smoothness of said region after the removal of the blemish, wherein said pixelization is a function of brightness variance around said region; and
- a blemish removal control for causing the GUI to display the blemish removal tool.

15. The computer readable storage medium of claim 14, wherein said pixelization is modulated with Gaussian noise.

\* \* \* \* \*